US010299077B1

(12) United States Patent
Liu et al.

(10) Patent No.: US 10,299,077 B1
(45) Date of Patent: May 21, 2019

(54) APPARATUS AND METHOD FOR TRANSFORMING AND CLEANING POSITION DATA FOR A DATABASE-BASED POSITIONING SYSTEM

(71) Applicant: Marvell International Ltd., Hamilton (BM)

(72) Inventors: BoChih Liu, Shanghai (CN); Zhike Jia, Fremont, CA (US); Jing Yu, Shanghai (CN); Han Zhao, Shanghai (CN); Yuan Ren, Shanghai (CN)

(73) Assignee: Marvel International Ltd., Hamilton (BM)

( * ) Notice: Subject to any disclaimer, the term of this patent is extended or adjusted under 35 U.S.C. 154(b) by 206 days.

(21) Appl. No.: 15/258,437

(22) Filed: Sep. 7, 2016

Related U.S. Application Data

(60) Provisional application No. 62/369,576, filed on Aug. 1, 2016, provisional application No. 62/243,270, filed on Oct. 19, 2015.

(51) Int. Cl.
*H04W 4/02* (2018.01)
*H04W 24/08* (2009.01)
(Continued)

(52) U.S. Cl.
CPC ........... *H04W 4/025* (2013.01); *H04W 4/021* (2013.01); *H04W 4/023* (2013.01); *H04W 24/08* (2013.01);
(Continued)

(58) Field of Classification Search
CPC ... H04W 4/025; H04W 64/00; H04W 64/003; H04W 4/021; H04W 4/029; H04W 48/04
(Continued)

(56) References Cited

U.S. PATENT DOCUMENTS 9,197,998 B2 11/2015 Liu et al.
2008/0176583 A1* 7/2008 Brachet ................. G01S 5/0236
455/456.3
(Continued)

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
(Continued)

*Primary Examiner* — Jaime M Holliday

(57) ABSTRACT

A server including data loading, data analysis, transformation and cleaning (TAC), and position estimation modules. The data loading module loads original position data (OPD) sets. OPD points of the OPD sets refer to positions of a wireless device in communication with a wireless station. The data loading module loads each OPD set based on an identifier of the wireless station in a corresponding one of the OPD sets. The data analysis module: determines an overall bounding area based on the OPD points; divides the overall bounding area into minimum bounding areas; and assigns the OPD points to the minimum bounding areas. The TAC module: transforms and cleans some of the OPD points to provide updated points, such that the updated points have a less number of points than the some of the OPD points. The position estimation module estimates a position of the wireless device based on the updated points.

20 Claims, 9 Drawing Sheets

(51) Int. Cl.
*H04W 4/021* (2018.01)
*H04W 64/00* (2009.01)
*H04W 4/029* (2018.01)

(52) U.S. Cl.
CPC ............ *H04W 4/029* (2018.02); *H04W 64/00* (2013.01); *H04W 64/003* (2013.01); *H04W 64/006* (2013.01)

(58) Field of Classification Search
USPC .............................................. 455/456.1–457
See application file for complete search history.

(56) References Cited

U.S. PATENT DOCUMENTS

| | | | | |
|---|---|---|---|---|
| 2011/0227791 | A1* | 9/2011 | Lin ........................... | G01S 5/02 342/386 |
| 2012/0136865 | A1* | 5/2012 | Blom ................ | G06F 17/30141 707/739 |
| 2012/0139790 | A1* | 6/2012 | Wirola .................. | G01S 5/0252 342/385 |

OTHER PUBLICATIONS 802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE P802.11ac / D2.1; Draft STANDARD for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Mar. 2012; 363 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah/D3.0, Oct. 2014 (Amendment to IEEE Std 802.11REVmc / D3.0) IEEE P802.11ah™/D3.0 Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; 611 pages.

IEEE Std 802.15.4-2011 (Revision of IEEE Std. 802.15.4-2006); IEEE Standard for Local and metropolitan area networks—Part 15.4: Low-Rate Wireless Personal Area Networks (LR-WPANs); IEEE Computer Society; Sponsored by the LAN/MAN Standards Committee; Sep. 5, 2011; 314 pages.

\* cited by examiner

APPARATUS AND METHOD FOR TRANSFORMING AND CLEANING POSITION DATA FOR A DATABASE-BASED POSITIONING SYSTEM

CROSS-REFERENCE TO RELATED APPLICATIONS

This application claims the benefit of U.S. Provisional Application No. 62/243,270, filed on Oct. 19, 2015 and U.S. Provisional Application No. 62/369,576, filed on Aug. 1, 2016. The entire disclosures of the applications referenced above are incorporated herein by reference.

FIELD

The present disclosure relates to database-based position determination for wireless devices.

BACKGROUND

A service that provides information tailored to fit a customer's needs at a specific location of a wireless device of the customer is referred to as a location based service (LBS). The location of the wireless device can be determined via a positioning system. A wireless device that includes a positioning system is able to determine its position based on reception of signals from satellites and/or wireless stations. For example, a wireless device that includes a global positioning system is able to determine its position based on signals received from satellites. Satellite-based positioning provides high-accuracy position determination, but requires a line-of-sight condition between each of the satellites and the wireless device. Also, processing of the signals received from the satellites requires a substantial amount of energy, which quickly drains a battery of the wireless device. As another example, a wireless device can determine its position using triangulation based on known locations of the wireless stations to which the wireless device can communicate and characteristics (e.g., amplitude, phase, and time) of signals received from the wireless stations.

As a further example, database-based positioning can be used to determine a position of a wireless device by evaluating measurements of radio frequency (RF) signals. A server remotely located from the wireless device requests the fingerprints of the RF signals measured at the wireless device. These measurements are compared to entries in a database to determine a location of the wireless device. An estimate of the location of the wireless device is provided based on a database entry including values that best match the measurements. Database-based positioning provides high-accuracy position determination and does not rely on line-of-sight conditions, but benefits from more distinct radio patterns of multipath environments.

SUMMARY

A server is provided that includes a data loading module, a data analysis module, a transformation and cleaning module, and position estimation module. The data loading module is to load original position data sets stored in a first memory as part of a database, wherein the original position data sets include original position data points. Each of the original position data sets further includes an identifier of a wireless station. The original position data points are assigned to the wireless station and refer to positions of a wireless device in communication with the wireless station. The data loading module is to load each of the original position data sets based on the identifier of the wireless station in a corresponding one of the original position data sets. The data analysis module is to (i) determine an overall bounding area based on the original position data points, (ii) divide the overall bounding area into minimum bounding areas, and (iii) assign the original position data points to the minimum bounding areas. The transformation and cleaning module is to, based on one or more mapping rules, perform transformation and cleaning including (i) transforming some of the original position data points to updated position data points, and (ii) cleaning the some of the original position data points, such that the updated position data points includes less position data points than the some of the original position data points. The position estimation module is to perform database-based position estimation to estimate a position of the wireless device based on the updated position data points.

In other features, a method is provided and includes loading, at a server, original position data sets stored in a first memory as part of a database to a second memory. The original position data sets include original position data points. Each of the original position data sets further includes an identifier of a wireless station. The original position data points are assigned to the wireless station and refer to positions of a wireless device in communication with the wireless station. The data loading module is to load each of the original position data sets based on the identifier of the wireless station in a corresponding one of the original position data sets. The method further includes: determining an overall bounding area based on the original position data points; dividing the overall bounding area into minimum bounding areas; assigning the original position data points to the minimum bounding areas; and based on one or more mapping rules, performing transformation and cleaning including (i) transforming some of the original position data points to updated position data points, and (ii) cleaning the some of the original position data points, such that the updated position data points includes less position data points than the some of the original position data points. The method further includes performing database-based position estimation at the server to estimate a position of the wireless device based on the updated position data points.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers are reused to identify similar and/or identical elements.

DESCRIPTION

A database-based positioning system frequently loads and refreshes a large amount of position data into a memory of a server. The position data is received from a variety of sources (e.g., a variety of wireless devices). Accordingly, the probability that some of the position data is "dirty data" is high. Dirty data refers to data that is a duplicate of data and/or is inaccurate. Decisions, such as determining which customer data and/or service to provide to a wireless device, are often based on the position data. For this reason, accuracy of the position data is important to avoid making wrong decisions and conclusions. For example, reliance on duplicate position data results in incorrect and/or misleading statistics. Due to a wide range of possible position data inconsistencies, cleaning of the position data to remove the dirty data is difficult.

The below-described examples include a database-based positioning system including a server that transforms and cleans original position data sets to provide updated position data sets. The updated position data sets include less position data and are more accurate and provide more consistent results than the original position data sets. The updated position data sets are thus more effective than the original position data sets.

Figure 1:
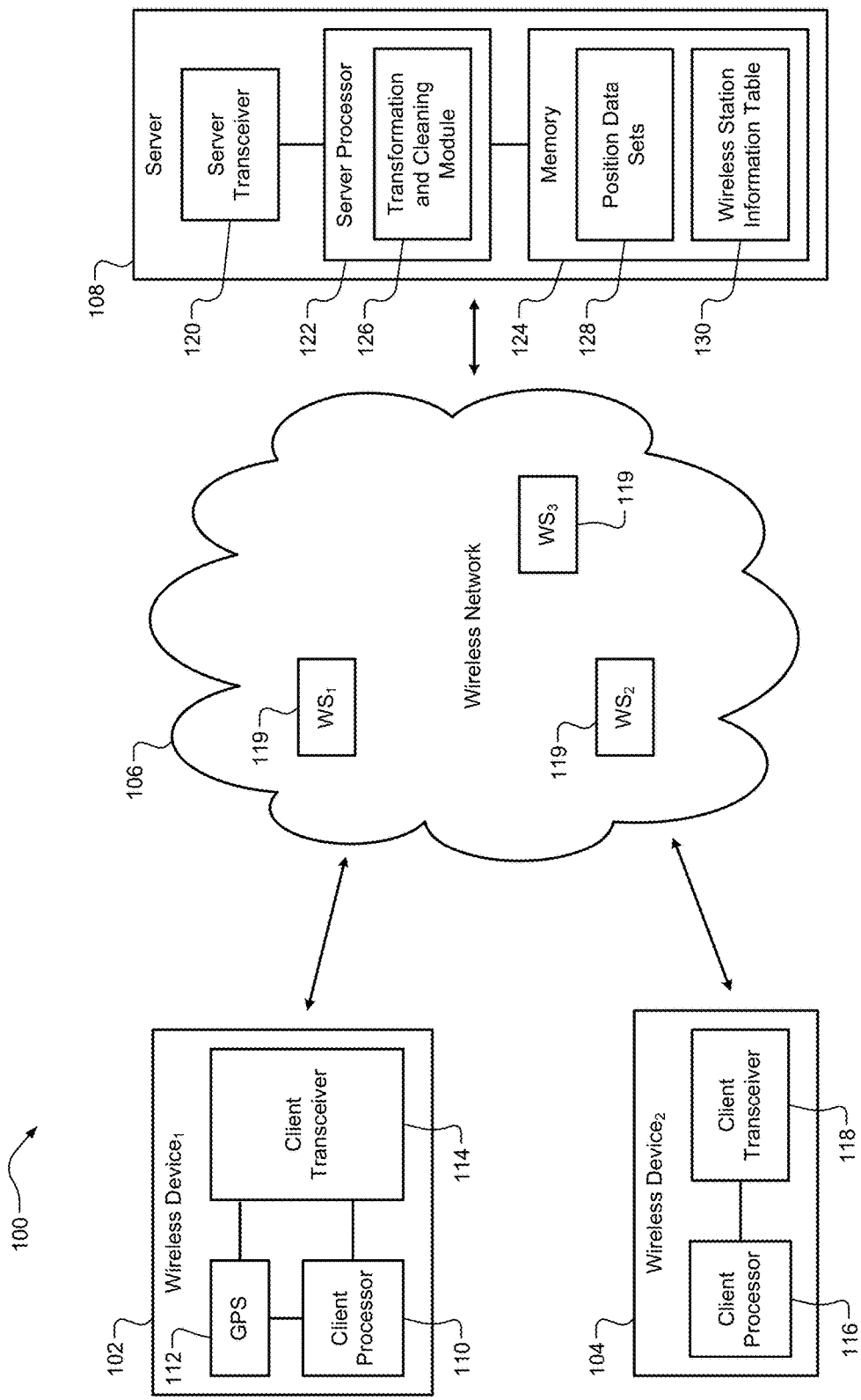
FIG. 1 is a functional block diagram of an example of a database-based positioning system in accordance with an embodiment of the present disclosure.

FIG. 1 shows a database-based positioning system 100 that includes wireless devices 102, 104, a wireless network 106, and a server 108. The first wireless device 102 includes a client processor 110, a global positioning system 112, and a client transceiver 114. The wireless device 104 includes a client processor 116 and a client transceiver 118. The wireless network 106 includes wireless stations 119. The server 108 includes a server transceiver 120, a server processor 122, and memory 124. Although a certain number of wireless devices and wireless stations are shown, any number of wireless devices and/or wireless stations may be included in the database-based positioning system 100.

Examples of the wireless devices 102, 104 are cellular devices, mobile devices, computers, personal data assistants, and wearable devices. Examples of the wireless network 106 include cellular and/or telecommunication networks, local area networks, wide area networks, personal area networks, etc.

In one embodiment, one or more of the wireless stations 119 are base stations, for example, (i) a cellular base station of a cellular network, or (ii) an access point of a wireless local area network (LAN) or a wireless personal area network (PAN). As an example, the wireless devices 102, 104 connect to the wireless stations based on beacon signals broadcast from the wireless stations. As another example, each of the wireless stations 119 serves wireless devices located in a corresponding geographic area.

Each of the wireless devices 102, 104 and wireless stations 119 is configured according to a wireless communication protocol, such as a global system for mobile (GSM) protocol, a code division multiple access (CDMA) protocol, a wideband code division multiple access (WCDMA) protocol, a long term evolution (LTE) protocol, an Institute of Electrical and Electronics Engineers (IEEE) 802.11 based protocol (e.g., WiFi network), an IEEE 802.15 based protocol (e.g., Bluetooth® network) and/or other suitable wireless communication protocol. This allows the wireless devices 102, 104 and the wireless stations 119 to transmit and receive RF signals. During operation, each of the wireless stations 119 broadcasts beacon signals including an identifier (e.g., a cell global identifier for a cellular network or a medium access control address for a wireless LAN) allowing the wireless devices 102, 104 to connect to the wireless station when the wireless devices are within a communication range of the wireless station. The wireless stations 119 provide the wireless devices 102, 104 with telephony services and/or communication access to, for example, an Internet.

As an example, the wireless device 102 includes the client transceiver 114, which may receive signals from satellites (not shown). The GPS 112 demodulates the received signals to retrieve transmission timing information and satellite location information. Based on the received timing information, the GPS 112 calculates distances from the wireless device to the satellites. The distances to the satellites and the satellite location information are used to determine the location of the wireless device 102. Values representing the location of the wireless device 102 include and/or are directly related to geographical coordinates, such as latitude, longitude, and/or altitude coordinates of the wireless device 102.

As another example, the wireless device 102 includes the client transceiver 114, which may receive beacon signals broadcast from wireless stations 119. The client processor 110 obtains the fingerprints of wireless communication at the location of the wireless device 102, such as identifiers of wireless stations 119 that are in wireless communication with the wireless device 102, and characteristics of RF signals at the location. For example, characteristics of a RF signal received at the location includes, but is not limited to, a received signal strength indicator (RSSI) of the received RF signal and a time of flight of a RF signal received at the location.

In one embodiment, the client processor 110 prepares a message for the server 108 according to a network communication protocol (e.g., software for implementing communication protocol, such as a transmission control protocol/internet protocol (TCP/IP), a hypertext transfer protocol (HTTP), etc.). The message carries information that includes position data. The position data includes (i) position information of a location of the wireless device 102, (ii) an identifier of one of the wireless stations 119, and (iii) a characteristic of a RF signal received at the location of the wireless device 102 from the wireless station 119. The wireless device 102 then sends the message to the wireless station 119 and the wireless station 119 forwards the message to the server 108 via the wireless network 106. As the wireless device 102 moves between locations and communicates with different wireless stations, the wireless device 102 receives the different fingerprints of wireless communication at the different locations. The wireless device 102 provides position information (e.g., coordinates of the wireless device 102) associated with the fingerprints of wireless communication at the different locations to the server 108.

As an example, the server 108 includes the server transceiver 120, which may receive a message carrying information. The server processor 122 retrieves from the message, the position information and the associated wireless fingerprints, such as an identifier of a wireless station and a value of RSSI, to form a position data set and stores the position data set in the memory 124.

In one embodiment, multiple wireless devices are similarly configured as the wireless device 102 to send messages carrying information to form position data from different locations. The server 108 receives the messages, forms the position data sets and stores the position data sets as part of a database in the memory 124. Based on the position data sets, the server processor 122 provides positioning service to another wireless device, such as the wireless device 104.

In the example shown, the wireless device 104 does not include a GPS, but is able to request a location of the wireless device 104 from the server 108. The wireless device 104 includes the client transceiver 118, which may receive beacon signals broadcast from wireless stations 119. The client processor 116 obtains the fingerprints of wireless communication at the unknown location of the wireless device 104, such as identifiers of wireless stations 119 and characteristics of RF signals (e.g., RSSI values) at the unknown location. The client processor 116, according to a network communication protocol, sends a position request message to the server 108 through the client transceiver 118. The position request message carrying information that includes (i) identifiers of one or more of the wireless stations 119 and (ii) one or more of RSSI values received at the unknown location. In an embodiment, when the server 108 receives the position request message from the wireless device 104, the server 108 identifies the one or more wireless stations that are in communication with the wireless device 104. The server 108 accesses a group of position data sets associated with the one or more wireless stations and determines a location of the wireless device 104. Determination and indication of the position to the wireless device 104 is further described below with respect to FIG. 9.

The server processor 122 includes a transformation and cleaning module 126. The transformation and cleaning module 126 transforms and cleans position data sets to reduce the number of position data sets and provide updated position data sets having improved accuracy. This allows a position of a wireless device to be determined based on the updated position data sets quicker than if determined based on non-transformed and non-cleaned position data sets. The reduction in the number of position data sets also frees up memory for other uses. Operation of the transformation and cleaning module 126 is further described below with respect to the embodiments illustrated in FIGS. 2-8B.

In one embodiment, the position data sets are stored as part of a table (e.g., a wireless station information table). As an example, each row of the table includes latitude, longitude, and altitude coordinates, a wireless station identifier, and a RSSI value for a wireless device received at the location from the wireless station. The position data sets (shown as position data sets 128) are grouped into subsets according to the clustering information, which is also stored in the memory 124 as part of wireless station information tables 130. Each entry in the wireless station information tables 130 includes multiple fields of clustering information. In one embodiment, each of the entries for a cellular network, for an example, includes fields, such as: an identification of the cellular technology type; a mobile country code; a mobile network code; a local area code; a cell identifier; a latitude value of the cellular base station; a longitude value of the cellular base station; a number of uncertainty errors for the position data sets in an overall group; a total number of position data sets in the overall group; a number of uncertainty errors for respective subsets of position data sets; numbers of position data sets in the respective subsets of position data sets; coverage ranges of RF transmission of a wireless station; a RSSI threshold; RSSI ranges; a most recent position request inquiry time; and a most recent position update time. In one embodiment, the group of position data sets includes the subsets of position data sets. Each of the subsets includes position data sets having RSSI values within a respective one of the RSSI ranges.

In another example, one of the wireless station information tables is for a wireless LAN and includes fields of clustering information per table entry. Each table entry is for a group of position data sets associated with an access point in the wireless LAN. The group of position data sets is clustered into two subsets according to RSSI values. The fields include: an identification of wireless LAN type, a mobile country code, one or more MAC addresses, a latitude of the access point, a longitude of the access point, a number of uncertainty errors for the position data sets of an overall group, a total number of position data sets in the overall group, numbers of uncertainty errors for the respective subsets of position data, numbers of position data sets in the respective subsets, coverage ranges of RF transmission of a wireless station, a RSSI threshold; RSSI ranges, a most recent position inquiry time, and a most recent position update time.

Figure 2:
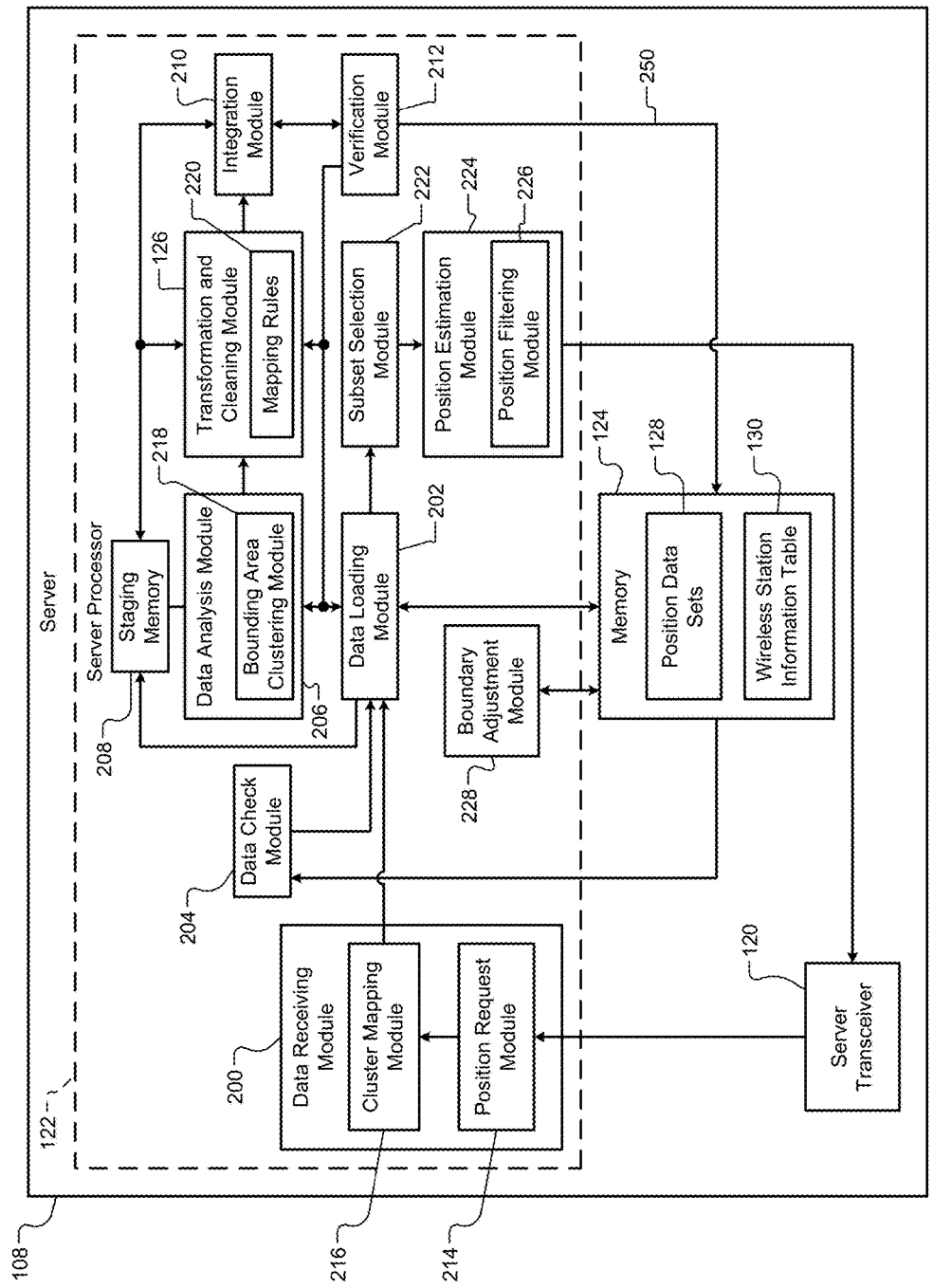
FIG. 2 is a functional block diagram of an example of a server of the database-based positioning system of FIG. 1.

FIG. 2 shows the server 108 of the database-based positioning system 100 of FIG. 1. The server 108 includes the server transceiver 120, the server processor 122 and the memory 124. The server processor 122 includes a data receiving module 200, a data loading module 202, a data check module 204, a data analysis module 206, the transformation and cleaning module 126, a staging memory 208, an integration module 210, and a verification module 212. In an embodiment, one or more of the modules of the server processor 122 is located separate from the server processor 122. For example, in an embodiment, the verification module 212 is implemented as a processor that is separate from the server processor 122. The data receiving module 200 includes a position request module 214 and a cluster mapping module 216. The data analysis module 206 includes a bounding area clustering module 218. The transformation and cleaning module 126 includes mapping rules 220. Operations of the modules 202, 204, 206, 208, 210, 212, 218 and content of the mapping rules 220 are described below with respect to the method of FIG. 3. The server processor 122 further includes a subset selection module 222 and a position estimation module 224. The position estimation module 224 includes a position filtering module 226. Operations of the modules 200, 202, 214, 216, 222, 224, 226 are described below with respect to the embodiment of FIG. 9.

The server processor 122 further includes a boundary adjustment module 228. The boundary adjustment module 228 dynamically adjusts clustering boundaries of subsets of position data sets. In an embodiment, the boundary adjustment module 228 dynamically adjusts the clustering boundaries such that the subsets of a group have relatively uniform population. In an example, the boundary adjustment module 228 determines a value of cumulative distribution function (CDF) for the subsets. The CDF value is calculated based on a population distribution in each subset. When the CDF values for the subsets are in a range, the subsets are configured to possibly have uniform population across the subsets. When a CDF value for a subset is out of the range, the boundary adjustment module 228 determines RSSI boundary values to redefine the subsets in order to achieve relatively uniform population across the subsets for the group. The boundary adjustment module 228 then updates the RSSI boundary values in entries for the group of position data sets of one of the wireless station information tables 130.

Figure 3:
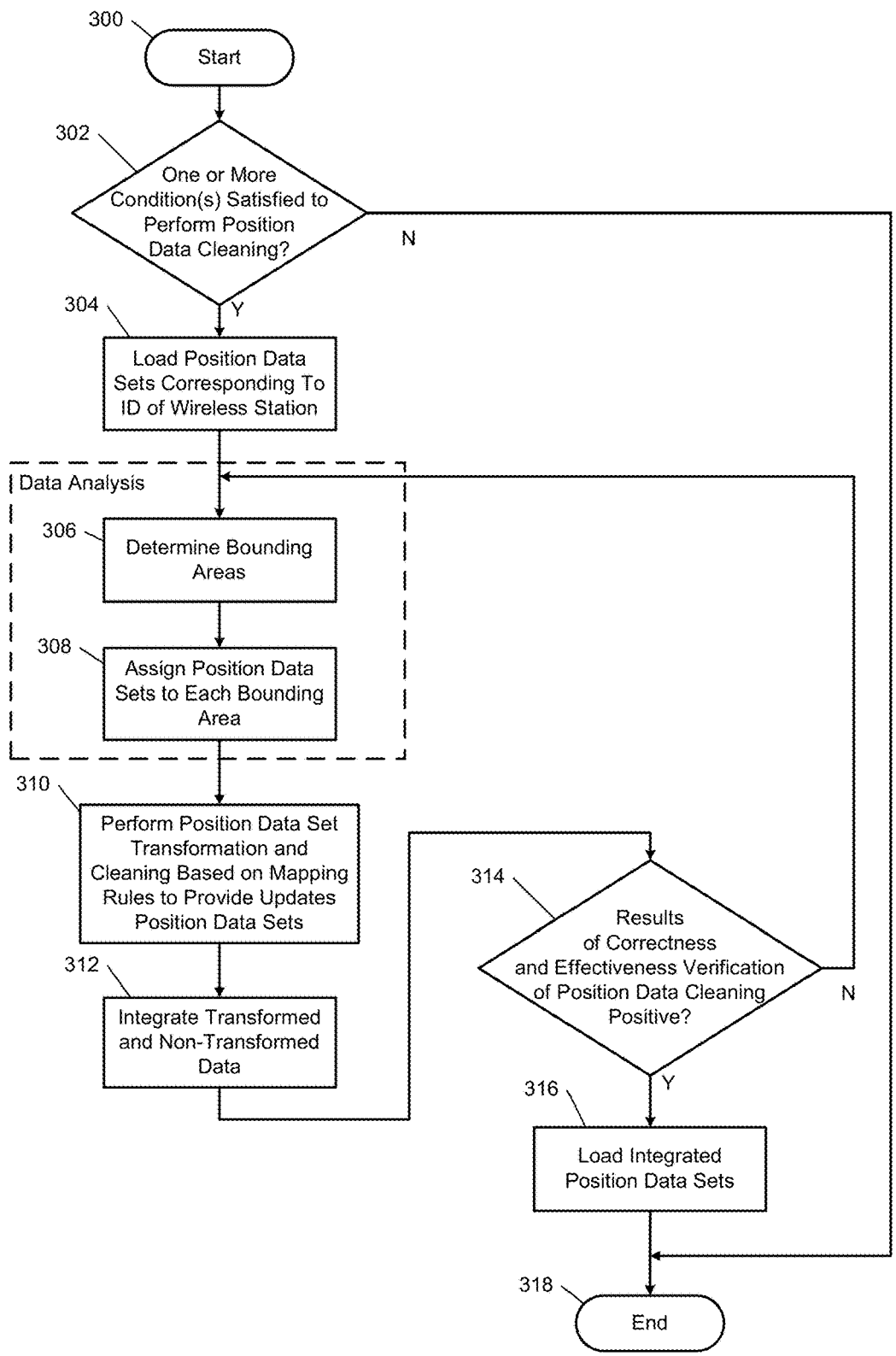
FIG. 3 illustrates an example method of transforming and cleaning position data within the database-based positioning system of FIG. 1.
Figure 9:
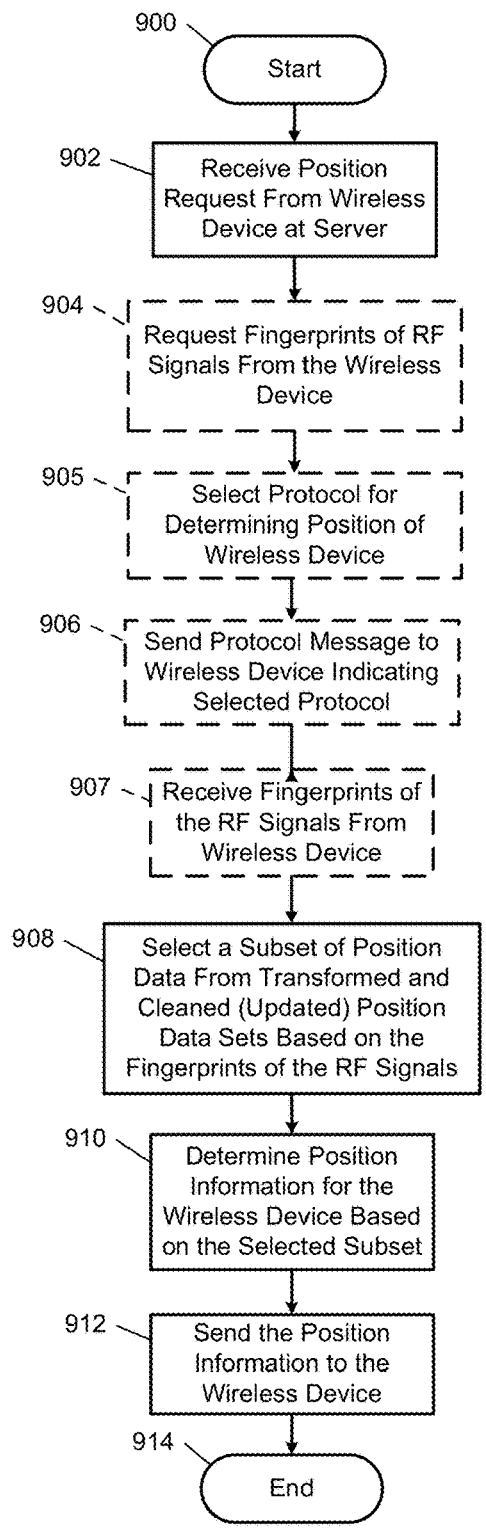
FIG. 9 illustrates an example method of determining a position of a wireless device in accordance with an embodiment of the present disclosure.

For further defined structure of the modules of FIGS. 1-2 see below provided methods of FIGS. 3 and 9 and below provided definition for the term "module". The systems disclosed herein are operable using numerous methods, example methods are illustrated in FIGS. 3 and 9. In FIG. 3, a method of transforming and cleaning position data within the database-based positioning system 100 is shown. Although the following methods are shown as separate methods, in an embodiment, one or more methods and/or operations from separate methods are combined and performed as a single method. Although the following operations are primarily described with respect to the implementations of FIGS. 1-2, the operations may be easily modified to apply to other implementations of the present disclosure. The operations are iteratively performed in one embodiment.

The method begins at 300. At 302, the data check module 204 determines whether one or more conditions are satisfied to perform position data cleaning. In one embodiment, a condition is checked as to whether a ratio of (i) a total number of position data sets to (ii) a coverage range, exceeds a predetermined threshold. The coverage range is a RF transmission range of a wireless station. For example, a WiFi® station owns 120,000 position data sets for respective positions distributed in a coverage range and has the coverage range of the WiFi® station is 200 meters. The calculated ratio indicates the WiFi station owns 600 position data sets per meter. Accordingly, the condition for performing position data set cleaning is satisfied. Determination that the condition is satisfied implies the position data sets include "dirty data", which is to be removed. Operation 304 is performed if the one or more conditions are satisfied. The method ends at 318 if the one or more conditions are not satisfied.

At 304, the data loading module 202 uses the identifier of the wireless station to load from the memory 124 a group of original position data sets associated with the identifier to the staging memory 208. The loaded group of original position data sets is provided to the data analysis module 206 and/or a memory accessible to the data analysis module.

At 306, the data analysis module 206 performs position data analysis including determining an overall bounding area based on the loaded original position data sets, and more specifically, original position data points included in the original position data sets. Data analysis is performed to determine which of the original position data sets include dirty data and should be removed. The data analysis module 206 has access to the staging memory 208. In one embodiment, the overall bounding area is a rectangular shaped area or square shaped area. The overall bounding area is then divided into multiple cells (or N bounding areas, where N is an integer greater than or equal to 1). Each of the cells has a predetermined length and a predetermined width. As an example, the predetermined length and the predetermined width are 5-10 meters. Each cell is referred to as a minimum bounding box with minimum and maximum boundary location points (e.g., an eastern most location, a western most location, a northern most location, and a southern most location). The minimum and maximum boundary location points of a cell are on sides (or linear borders) of the cell.

Figure 4:
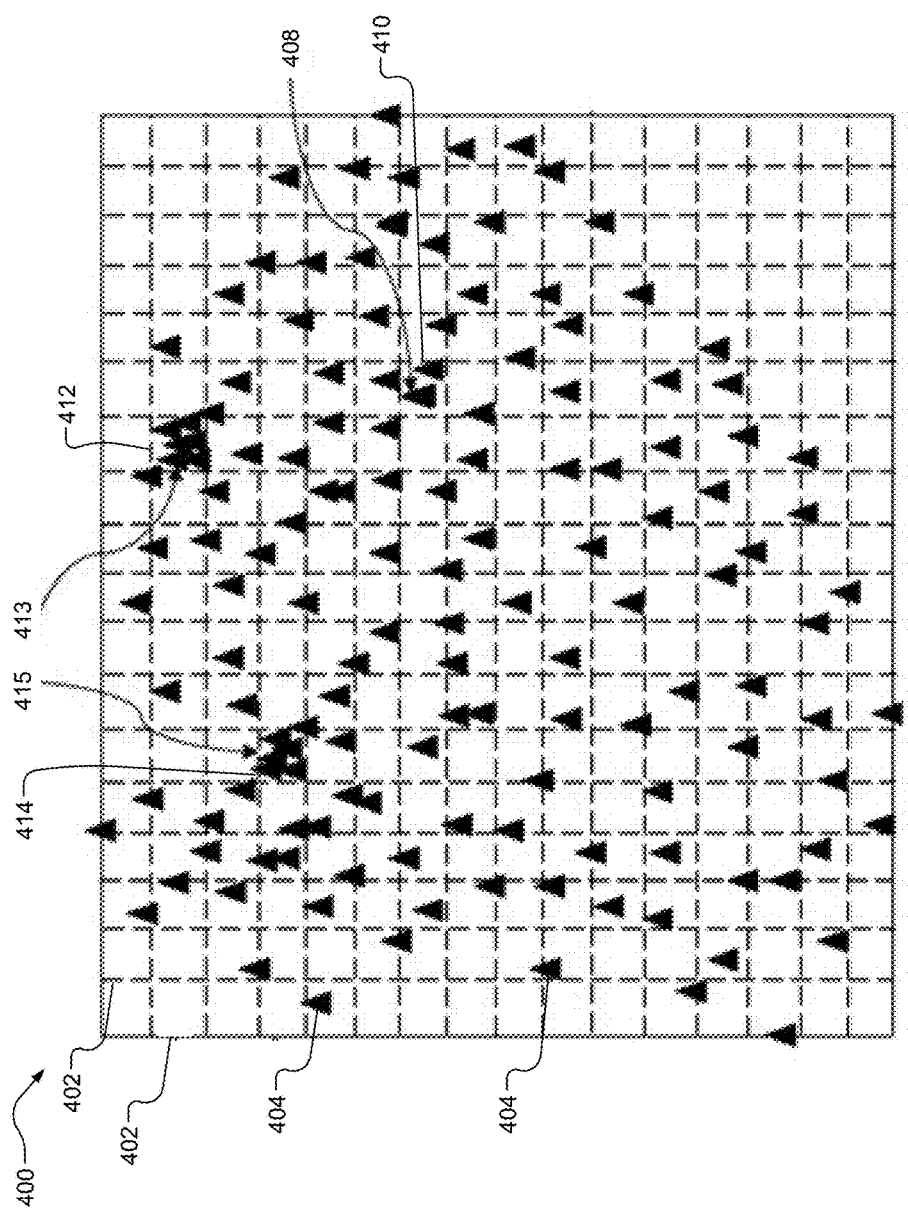
FIG. 4 is an example position data set diagram illustrating relationships between bounding areas and position data for a wireless station in accordance with an embodiment of the present disclosure.

At 308, the bounding area clustering module 218, based on the cells determined at 306, assigns each of the original position data sets of the group to a corresponding one of the cells. In one embodiment, the assignment is done by comparing the position information (e.g., latitude and longitude values) for each original position data set to the minimum and maximum boundary location points of the cells to determine in which one of the cells the original position data set belongs. FIG. 4 shows an example position data set diagram 400 illustrating relationships between bounding areas (or cells) 402 and position data for a wireless station. The position data points are represented by triangles 404. Each of the original position data sets is in one of the cells. Each cell has any number of original position data sets or no position data sets.

Referring again to FIG. 3 and prior to performing operation 310, the original position data sets and corresponding cell information (i.e. cell assignment) is provided to and/or is accessible to the transformation and cleaning module 126. The transformation and cleaning module 126 has access to the staging memory 208. At 310, the transformation and cleaning module 126 performs position data set transformation and cleaning, based on mapping rules to enable changes of a position data structure, position data representation, and/or content of position data sets. The position data structure refers to the number of position data points within one or more of the cells. The position data representation refers to the locations of the position data points and/or layout (or plot) of the position data points (e.g., a plot of latitude and longitude points). The content of the position data sets refers to the values related to and/or including latitude, longitude and/or altitude coordinates. During transformation and cleaning, position data is averaged and/or removed to provide fewer position data points, which changes the structure, representation and/or content of the original position data sets to provide updated position data sets. In an embodiment, the updated position data sets include one or more of the original position data sets that existed prior to transformation and cleaning.

The mapping rules as applied to a cell are based on a degree of heterogeneity of position data sets in the cell. As mentioned previously, each position data set can associate position information of a location with the fingerprints of wireless communication at the location of the wireless device. The fingerprints include an identifier of a wireless station and a characteristic of a RF signal. The degree of heterogeneity is directly related to the position information and/or the RF signal characteristics. As an example, when the number of position data sets associated with the cell exceeds a threshold of transforming and cleaning position data, the "dirtiness" probability that the degree of heterogeneity for position information of position data sets is below a predetermined degree is high. This implies that some of the position data sets in the cell include duplicate and/or inaccurate position information. Heterogeneity may refer to the coordinates of position information and/or distances between the position data points in a cell. As another example, when the number of position data sets associated with a cell exceeds a threshold of transforming and cleaning position data, the "dirtiness" probability that the degree of heterogeneity for RF signal characteristics of position data sets is below a predetermined degree is high. This implies that some of the position data sets in the cell include duplicate RF signal characteristics (e.g., duplicate RSSI values).

Referring to FIGS. 3-4, cell 410 is shown and as an example includes 10 position data points having locations represented by triangles 408 in cell 410. The 10 position data points exist after data analysis has been performed at 306 and 308 and exceed a threshold (e.g., 5 position data points) of transforming and cleaning position data. In one embodiment, a degree of heterogeneity is evaluated for the cell 410. The degree of heterogeneity is determined based on the coordinates of position data points (or the distances between the position data points) and is below a predetermined degree, since there only has two position coordinates for (or one distance between) 10 position data points in the corresponding cell 410 (i.e., 9 position data points have the same position coordinates represented by overlapping triangles 408). This implies that duplicate position data exists for the corresponding cell 410. The transformation and cleaning module 126 performs position data transformation including calculating an average of duplicate position information of a first position data point and non-duplicate position information of a second position data point adjacent or nearby the first position data point. The average position information is designated as the updated position information. In an embodiment, the transformation and cleaning module 126 averages two or more latitude point values to provide a single latitude point value of an updated position data point. Similarly, two or more longitude values are averaged to provide a single longitude point value for the updated position data point. The duplicate position information and the non-duplicate position information are removed from the group of position data sets stored in the staging memory 208. The updated position information is stored in replacement of the duplicate position information and the non-duplicate position information.

As an example and after data analysis, cell 412 is shown having 6 position data points represented by triangles 413 and cell 414 is shown having 5 position data points represented by triangles 415. If a threshold for position data transformation and cleaning is 6, then transformation and cleaning is performed for cell 412 and is not performed for cell 414. In an embodiment, a degree of heterogeneity is evaluated for the cell 412. The degree of heterogeneity is determined based on RF signal characteristics of position data sets and is below a predetermined degree, since there only has two RSSI values for the corresponding cell 412. This implies some of the position data sets include duplicate RF signal characteristics. The transformation and cleaning module 126 performs position data transformation and cleaning by calculating an average of position information of a first position data points, in which these points have duplicate RSSI values, and position information of a second position data points, in which these points do not have duplicate RSSI values, as described above and replaces the position information of the position data sets with the resulting average position information.

The transformation and cleaning module 126 by averaging and removing original position data sets, performs position data cleaning. The number of position data sets associated with a cell is reduced when the transformed (or updated) position data sets have replaced original position data sets. Since the transformation and cleaning is performed in the staging memory 208, the transformation and cleaning is performed in a separate data staging area away from the memory 124. This occurs prior to the position data sets in the memory 124 being updated during below described operation 316.

At 312, the integration module 210, if not already combined, combines the transformed (or updated) position data in the staging memory 208 with non-transformed (or non-updated) position data in the staging memory 208 to provide integrated position data. Operation 312 refers to position data integration and results in integrated position data sets being stored in the staging memory 208. In one embodiment, the integrated position data is stored as a table. As an example, each row in the table includes information pertaining to a position data set, such as the corresponding coordinates, an identifier of the wireless station, and a characteristic of a wireless RF signal. Following the integration, the integrated position data sets are provided to the verification module 212. In one embodiment, operation 314 is skipped and the integrated position data sets are downloaded to the memory 124 via operation 316.

At 314, the verification module 212 is configured to verify the correctness and effectiveness of position data transformation and cleaning when the integrated position data sets are provided to the verification module 212. In one embodiment, the verification module 212 includes and/or is implemented as a processor. In an embodiment, the verification process includes generating and/or accessing CDF value versus position error for the original position data sets and the integrated data sets. Each CDF value indicates a probability that a position error for a position data source is less than or equal to a certain position error. A CDF of position error is used for measuring precision of a positioning system. In an embodiment, accuracies of different position data sources are determined and/or compared based on corresponding CDFs of position error. In an embodiment, the verification module 212 determines whether a transformation and cleaning method has failed to provide a predetermined position accuracy level based on a CDF of position error for position data resulting from performance of the transformation and cleaning method.

Figure 5A:
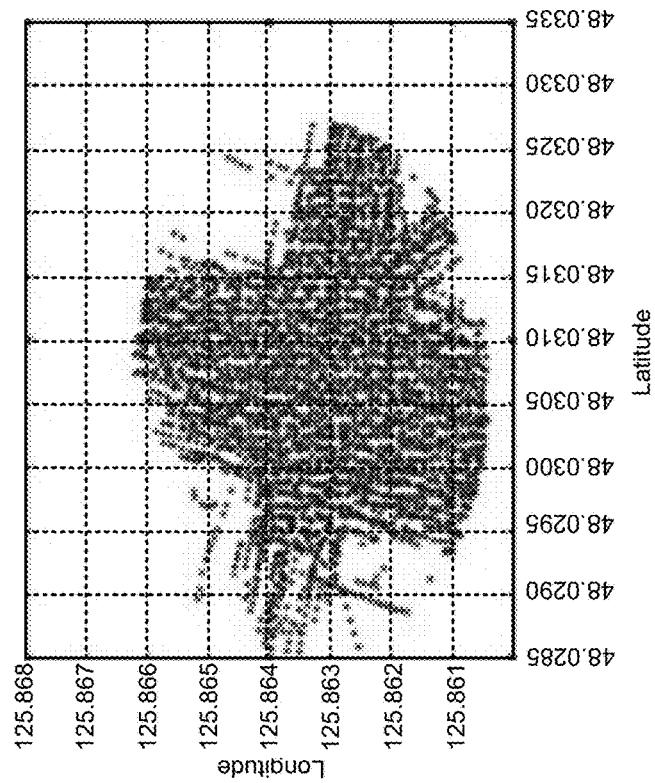
FIG. 5A is an example plot of position data prior to transformation and cleaning.
Figure 5B:
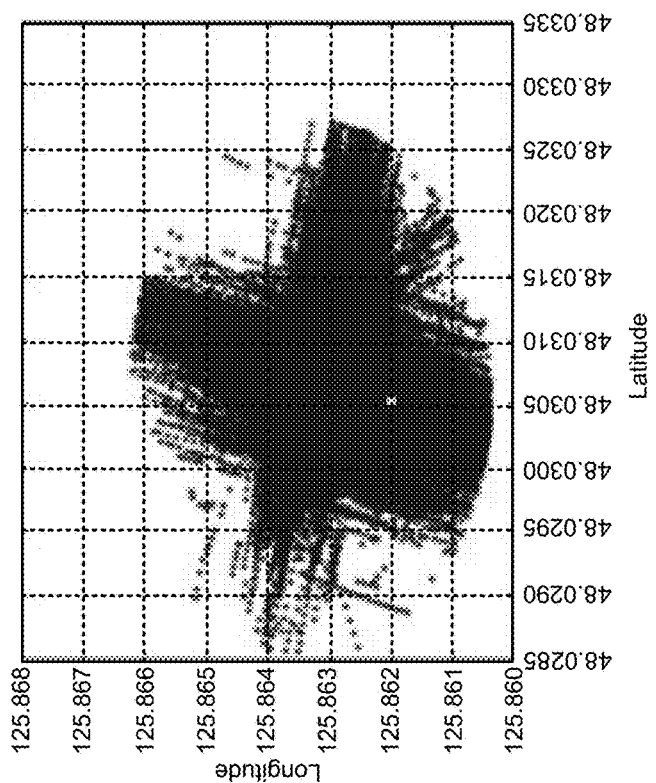
FIG. 5B is an example plot of position data subsequent to transformation and cleaning of the position data of FIG. 5A in accordance with an embodiment of the present disclosure.
Figure 7A:
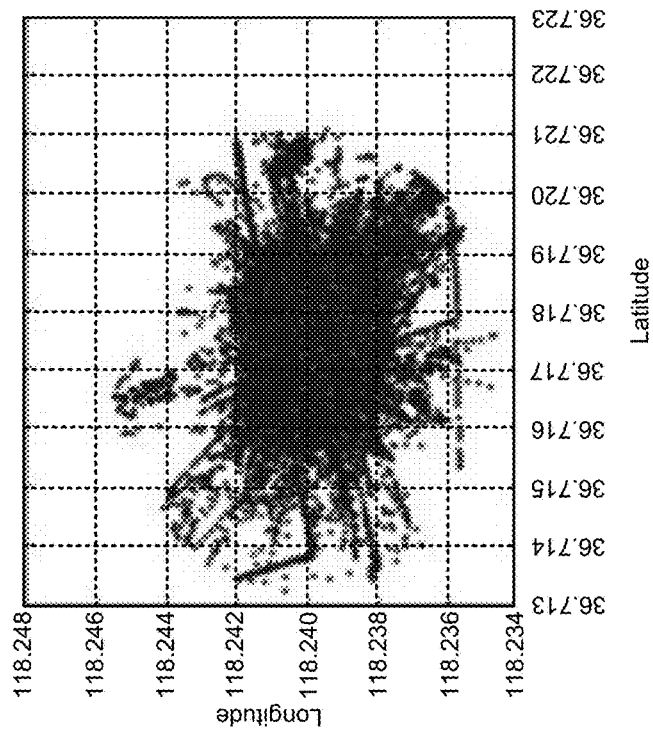
FIG. 7A is an example plot of position data prior to transformation and cleaning.
Figure 7B:
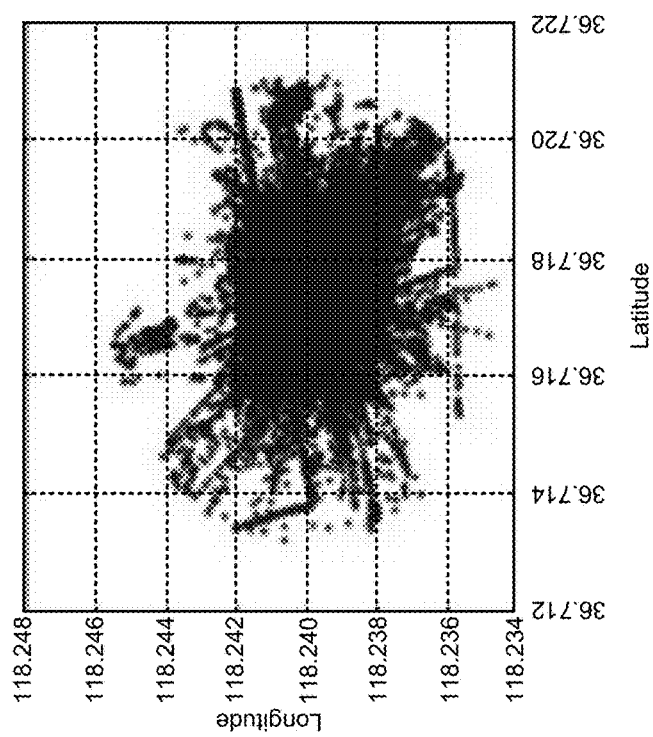
FIG. 7B is an example plot of position data subsequent to transformation and cleaning of the position data of FIG. 7A in accordance with an embodiment of the present disclosure.

Examples of original position data points of original position data sets existing prior to transformation and cleaning are shown in FIGS. 5A and 7A. Examples of integrated position data points of integrated position data sets existing subsequent to transformation, cleaning and integration are shown in FIGS. 5B and 7B. The integrated position data points of FIG. 5B are a result of transformation and cleaning the original position data points of FIG. 5A. Similarly, the integrated position data points of FIG. 7B are a result of transformation and cleaning the original position data points of FIG. 7A. For the example of FIG. 5A, a wireless station (e.g., wireless LAN station) owns 128,666 original position data points. After position data transformation, cleaning and integration, the wireless station owns 3,546 integrated position data points, as shown on FIG. 5B. For the example of FIG. 7A, a wireless station (e.g., a cellular station) owns 157,557 original position data points. After position data transformation and cleaning, the wireless station owns 6,763 updated position data points, as shown on FIG. 7B. As shown by these examples, position data transformation and cleaning substantially reduced the number of position data points and corresponding position data sets. The reduction in the number of position data sets reduces the amount of memory needed to store the position data sets and allows for a quicker determination of a position of a wireless device.

Figure 6B:
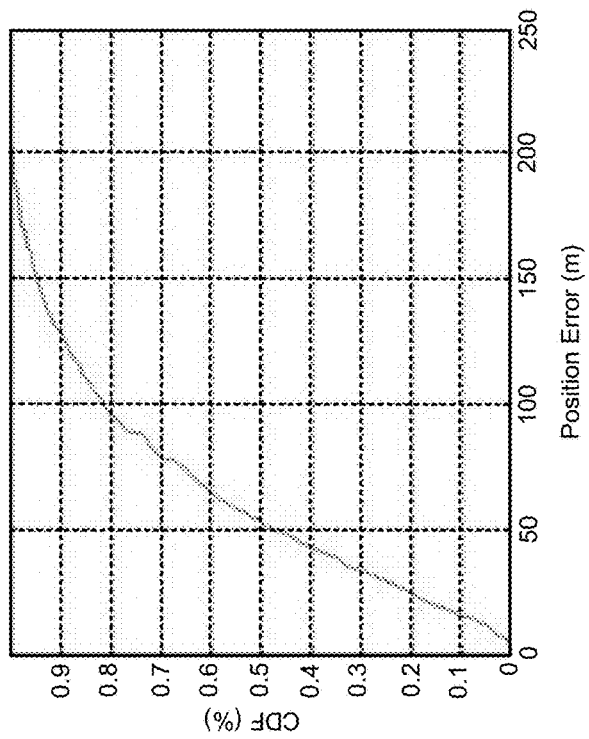
FIG. 6B is an example plot of CDF values versus position error for the position data of FIG. 5B in accordance with an embodiment of the present disclosure.
Figure 6A:
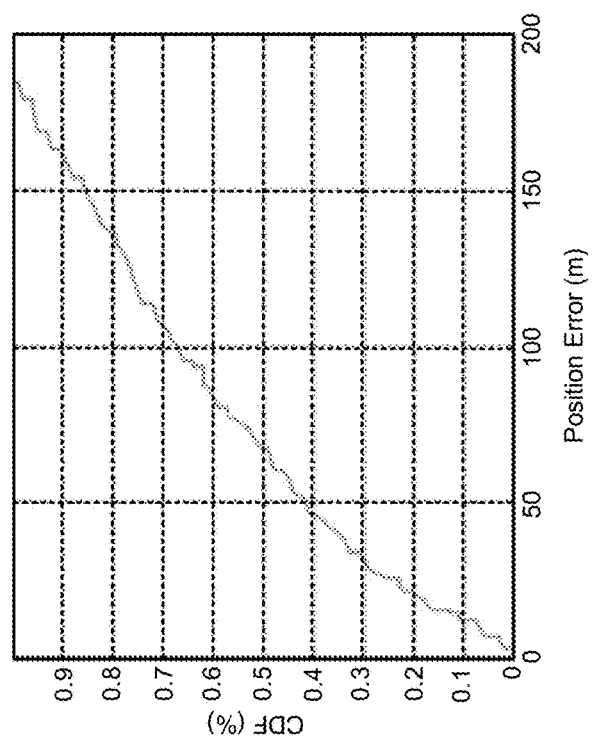
FIG. 6A is an example plot of cumulative distribution function (CDF) values versus position error for the position data of FIG. 5A.

FIGS. 6A, 6B, 8A and 8B show example plots of CDF values versus position error for the position data respectively of FIGS. 5A, 5B, 7A and 7B. The verification module 212 verifies the correctness and effectiveness of position data transformation and cleaning by comparing a CDF value for original position data relative to a predetermined position error to a CDF value for integrated (or updated) position data relative to the same predetermined position error. For example, a CDF value of 67% for original position data corresponds to a position error of 100 meters (m), as shown in the example of FIG. 6A. A CDF value of 82% for integrated position data corresponds to the position error of 100 m, as shown in the example of FIG. 6B.

In one embodiment, the verification process includes comparing the position errors for a same predetermined CDF value (e.g., 80% or 95%). If the position error determined by the integrated position data is smaller than that determined for the original position data, the verification is a success, otherwise the verification failed.

Position error results of the transformation and cleaning process shown in FIG. 6B demonstrates that the position error determined for the integrated position data is better than the position error shown in FIG. 6A determined for the original position data. If the verification is successful, the integrated position data is loaded to the memory 124 for storage at 316, and the information on wireless station information table 130 is updated (e.g., the total number of position data is updated in the wireless station information table 130). If the verification is not successful, the verification module 212 notifies one or more of the modules 126, 202, 206, 210 to perform the analysis, transformation and cleaning and integration process again. In an embodiment, the verification module 212 sends the integrated position data to one or more of the modules 126, 202, 206, 210 and/or to the staging memory 208. The data analysis, transformation and cleaning, and integration processes are then repeated. In an embodiment, operation 306 is performed subsequent to operation 314 if the verification process failed.

In another embodiment, the verification is determined to be a success if (i) for a given CDF value, a difference in the position error for the integrated position data and the position error for the original position data is less than a first predetermined amount, and/or (ii) for a given position error, a difference in the CDF value for the integrated position data and the CDF value for the original position data is less than a second predetermined amount. Thus, the verification is a success if, for a given CDF value, the position error for the integrated position data is greater than the position error for the original position data and the difference between the position error for the integrated position data and the position error for the original position data is less than the first predetermined amount. In an embodiment, the first predetermined amount is based on the position error for the original position data. In another embodiment, the first predetermined amount is equal to twice the position error for the original position data. In another example embodiment, the second predetermined amount is based on the CDF value for the original position data.

Figure 8A:
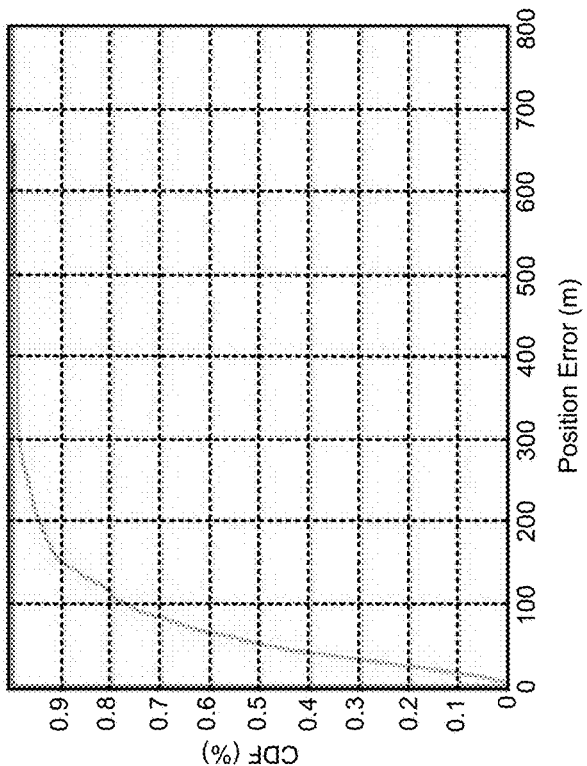
FIG. 8A is an example plot of CDF values versus position error for the position data of FIG. 7A.
Figure 8B:
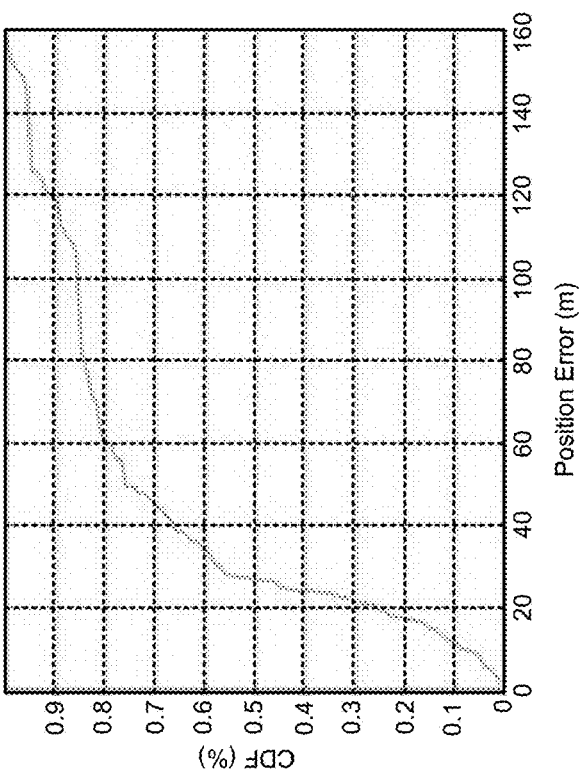
FIG. 8B is an example plot of CDF values versus position error for the position data of FIG. 7B in accordance with an embodiment of the present disclosure.

Results shown in FIG. 8B illustrates an example when the position error determined for the integrated position data is not as good as the position error determined for the original position data. However, since the difference between the position error for the updated position data and the position error for the original position data is less than the first predetermined amount (e.g., twice the position error for the original position data), the verification is a success. The corresponding communication and processing delays associated with determining position of a wireless device based on the integrated position data for the example of FIGS. 7A-8B is reduced significantly due to the large reduction is position data sets. Since the verification is a success, the integrated position data is loaded to the memory 124 and the information in the corresponding wireless station information table is updated.

At 316, the integrated position data and corresponding integrated position data sets are transferred from the staging memory 208, the integration module 210 and/or the verification module 212 to the memory 124. In FIG. 2, transfer of the integrated position data sets from the verification module 212 to the memory 124 is shown by arrow 250. The integrated position data sets replace the original position data sets stored in the memory 124, which were uploaded during operation 304. The method ends at 318.

The above-described operations are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The above-described method as described reduces communication and processing delays for position determination and as a result decreases position query runtime and allows for quick position request response times. Improved accuracy of position data is also provided. In addition, an amount of memory needed to store resultant integrated position data sets is reduced as compared to the amount of memory needed to store the original position data sets existing prior to performing the described method.

FIG. 9 an example method of determining a position of a wireless device is shown. In an embodiment, the operations of FIG. 9 are iteratively performed. The method begins at 900. At 902, the server transceiver 120 receives a position request from the wireless device. The position request is sent from the wireless device to the server transceiver 120 via one of the wireless stations of the wireless network 106 or directly to the server transceiver 120 depending on proximity of the wireless device to the wireless stations and the server 108. The wireless stations receiving the request message forward the message to the server transceiver 120.

The request message includes the fingerprints of RF signals, which are provided by the wireless device. As an example, the wireless device communicates with an access point in a wireless LAN and includes a MAC address of the access point in the request message. As another example, the wireless device communicates with a cellular base station in a cellular network and includes a global identifier of the cellular base station in the request message. The global identifier includes a mobile country code (MCC), a mobile network code (MNC), a local area code (LAC), and/or a cell identifier (Ci).

Operation 904 is optionally performed, such that the server processor 122 requests the fingerprints of RF signals from the wireless device. In one embodiment, the fingerprints are provided during operation 902 and operation 904 is not performed. In another embodiment, both operations 902 and 904 are performed independent of whether the fingerprints are provided during operation 902.

In an embodiment, the server processor 122 determines which position determination protocol to follow at 905 based on information in the request message. If the information in the request message identifies a cellular network, the server processor 122 follows a first protocol for position determination in the cellular network. If the information in the request message identifies a wireless LAN, the server processor 122 follows a second protocol for position determination in the wireless LAN. A third protocol is followed for a hybrid wireless network and a fourth protocol is followed when using a LAC to determine position. Then, at 906, the server processor 122 sends a protocol message to the wireless device indicating the selected protocol and requests the fingerprints of RF signals according to the selected protocol.

At 907, the server processor 122, based on the protocol message, receives the fingerprints of RF signals from the wireless device. The wireless device sends the fingerprints to the server transceiver 120 in response to the protocol message. If the protocol message indicates the first protocol, the wireless device provides an identifier (i.e., a MCC, MNC, LAC and Ci) of a cellular base station in communication with the wireless device and a RSSI value received by the wireless device from the cellular base station to the server 108. If the wireless device is at a location where coverage areas of multiple wireless stations overlap, multiple station IDs are provided. As a wireless LAN example, the wireless device is at a particular location (e.g., location at an airport) and performs a frequency scan and receives the fingerprints of RF signals from multiple wireless stations (e.g., multiple access points). Identifiers of the access points and RSSI values received by the wireless device are provided to the server at 907 and used for position determination of the wireless device at 910.

If the protocol message indicates the second protocol, the wireless device provides a MCC, a MAC address of an access point in communication with the wireless device, and a RSSI value received by the wireless device from the access point to the server 108. If the protocol message indicates the third protocol, the wireless device provides cumulated information including the information provided for both the first protocol and the second protocol to the server 108. If the protocol message indicates the fourth protocol, the wireless device refrains from providing information to the server 108.

At 908, the subset selection module 222 selects a subset of position data sets based on the fingerprints of the RF signals. In an embodiment, the server 108 identifies the wireless station using the identifier to retrieve a group of position data from the memory 124. The position data sets have similar signal characteristics as exhibited by the wireless device in the location of the wireless device. For example, the position data sets have RSSI values in a predetermined range of a RSSI value of the wireless device indicated in the position request message.

In another example embodiment, the group of position data associated with a wireless station is clustered into subsets according to signal characteristics, such as RSSI values. As an example, RSSI values are ranged from 0 to 100. The position data is clustered into a first subset with RSSI values from 0 to 33, a second subset with RSSI values from 34 to 66, and a third subset with RSSI values from 67 to 100. In another example, a maximum RSSI in the group of position data sets associated with the wireless station is 90 and a minimum RSSI in the group of position data sets associated with the wireless station is 10. The position data is clustered into a first subset with RSSI values from 10 to 30, a second subset with RSSI values from 31 to 50, a third subset with RSSI values from 51 to 70, and a fourth subset with RSSI values from 71 to 90. As another example, the group of position data is clustered into multiple subsets according to the RSSI values to have a uniform population of position data points in each of the subsets.

As an example, the subset selection module 222 retrieves a group of position data from the memory 124 corresponding to a wireless station having the indicated wireless station identifier. The group is clustered into subsets according to boundaries of RSSI values. The boundaries are fixed boundaries or are dynamically adjustable. In an embodiment, the boundaries are fixed and divide a space corresponding to the RSSI values. In another example, the boundaries are dynamically adjustable to maintain uniform populations across the subsets. If a received RSSI value is inside the boundaries of a group of position data, a subset in the group of position data is selected which has the received RSSI value inside boundaries of the subset. If the received RSSI value is outside the boundaries of the group of position data, a subset is determined based on closeness between the received RSSI value and the RSSI values in the subsets of the group of position data. The subset having RSSI values closest to the received RSSI value is selected.

In an embodiment, the subset selection module 222 identifies the n wireless stations using the n identifiers to retrieve the n groups of position data from the memory 124, where n is an integer greater than or equal to 1. The subset selection module 222 then selects the n subsets in the n groups of position data based on the n RSSI values.

At 910, the position estimation module 224 estimates a position of the wireless device and determines position information for the wireless device based on the selected subset. The position information includes the determined position of the wireless device. In one embodiment, the position information also includes an estimated uncertainty value associated with the determined position. In an embodiment, the server 108 calculates a position as an average or a weighted average of locations identified by position data points in the selected subset. In an embodiment, the estimated uncertainty value is calculated including a circular error probable (CEP) theory to calculate a threshold percent of a radius of a circle representing the determined position. The threshold percent (e.g., 90% or 95%) reflects a confidence of estimation. The estimated uncertainty value can differ from a location to a location based on the population distribution pattern of the locations (e.g., number of the locations, density of locations, location concentration area, and etc.) in the selected subset of position data. As an example, an estimated uncertainty value may be sufficiently small where the position information of the selected subset of position data is highly concentrated.

In an example, the server 108 determines if the received RSSI value is inside the RSSI boundaries of a subset of a group of position data sets. If the received RSSI value is inside the RSSI boundaries, then the position of the wireless device is determined based on a weighted average of position information for position data points in the subset. In another example, the server 108 determines if the received RSSI value is outside the RSSI boundaries of a subset of a group of position data sets. If the received RSSI value is outside the RSSI boundaries, then the position of the wireless device is determined based on an average of position information for position data points in the subset. Based on the determined position of the wireless device, the server 108 calculates an uncertainty value associated with the determined position.

At 910, the position estimation module 224 calculates the n locations using n selected subsets of position data and determines position information of the wireless device based on averages of coordinates of the n locations. The position filtering module 226 of the position estimation module 224 excludes outliers from the n locations prior to the position estimation module 224 determining the position information.

The position filtering module 226 applies a bounding box process to exclude outliers from a set of the n locations. In an example, the bounding box is determined including determining maximum and minimum points (e.g., eastern most, western most, northern most, and southern most points) as a rectangular area that contains a location at a center of the rectangular area. The location is determined by averaging a set of the n locations. The maximum and minimum points within the boundaries of the bounding box are determined using the set of the n locations. For example, the bounding box has boundaries, such that 95 percent of the coordinates of the n locations are within the boundaries of the bounding box. An average location of the bounding box is a center location within the bounding box. The position filtering module 226 (i) calculates a distance between the average location and each of the n locations in the set, (ii) identifies outliers having distances from the average location that exceed a threshold, and (iii) excludes the outliers from the set. The outliers are locations of the group of position data points that are furthest from the average location. After the position filtering module 226 has excluded outliers from a set of the n locations, the position filtering module 226 determines position information of the wireless device based on averaging the remaining locations in the set. The position filtering module 226 then calculates an estimated uncertainty value associated with the determined position.

At 912, the server 108 provides the position information and the uncertainty value in a response message to the wireless device. When the wireless device receives the response message from the server 108, the wireless device processes the response message and optionally displays the position, for example, as a circle on a map. In an embodiment, the estimated uncertainty value associated with the determined position is represented as radius of the circle. The method ends at 914.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A server comprising:
a data loading module to load original position data sets stored in a first memory as part of a database, wherein the original position data sets include original position data points, wherein each of the original position data sets further includes an identifier of a wireless station, wherein the original position data points are assigned to the wireless station and refer to positions of a wireless device in communication with the wireless station, and wherein the data loading module is to load each of the original position data sets based on the identifier of the wireless station in a corresponding one of the original position data sets;
a data analysis module to (i) determine an overall bounding area based on the original position data points, (ii) divide the overall bounding area into a plurality of minimum bounding areas, and (iii) assign the original position data points to the plurality of minimum bounding areas;
a transformation and cleaning module to, based on the plurality of minimum bounding areas and one or more mapping rules, perform transformation and cleaning including (i) transforming some of the original position data points to updated position data points, and (ii) cleaning the some of the original position data points, such that the updated position data points includes less position data points than the some of the original position data points,
wherein
the one or more mapping rules includes determining a degree of heterogeneity of the original position data points based on boundaries of the plurality of minimum bounding areas,
the degree of heterogeneity refers to differences in coordinate values and/or received signal strength indicator values of original position data points within one of the plurality of minimum bounding areas and is based on a number of the original position data points within the one of the plurality of minimum bounding areas, and
the transformation and cleaning module is to perform the transformation and cleaning of the some of the original position data points based on the degree of heterogeneity;
and
a position estimation module to perform database-based position estimation to estimate a position of the wireless device based on the updated position data points.

2. The server of claim 1, wherein:
the data loading module is to load the original position data sets to a second memory separate from the first memory; and
the transformation and cleaning module is to transform and clean the some of the original position data points in the second memory.

3. The server of claim 2, further comprising:
an integration module to integrate the updated position data points with non-updated ones of the original position data points to provide integrated position data points;
a verification module is to perform a verification process to verify accuracy of the integrated position data points; and
a server processor to replace the original position data points in the first memory with the integrated position data points if the verification process is a success, and cause the transformation and cleaning module to transform and clean the updated position data points if the verification process failed.

4. The server of claim 3, wherein the verification module is to determine that the verification process is a success if, for a cumulative distribution function value, a position error for the integrated position data points is less than or within a predetermined range of a position error of the original position data points.

5. The server of claim 1, further comprising a data check module to:
  determine whether a condition is satisfied to perform database-based position data cleaning, wherein the condition is satisfied when a ratio of (i) a number of position data sets corresponding to the wireless station to (ii) a size of a coverage area of the wireless station, is greater than a predetermined ratio; and
  if the condition is satisfied, permit the transformation and cleaning module to perform the transformation and cleaning of the some of the original position data points.

6. The server of claim 5, wherein, if the condition is not satisfied, prevent the transformation and cleaning module performing the transformation and cleaning of the some of the original position data points.

7. The server of claim 1, wherein the analysis module is to:
  define the overall bounding area based on maximum coordinate values and minimum coordinate values of the original position data points; and
  divide the overall bounding area into the plurality of minimum bounding areas based on a predetermined number of bounding areas.

8. The server of claim 1, wherein the transformation and cleaning module is to:
  average duplicate position data in the original data sets and non-duplicate position data in the original data sets to provide the updated position data; and
  replace the duplicate position data and the non-duplicate position data with the updated position data.

9. The server of claim 8, wherein the transformation and cleaning module is to determine which of the original position data sets include the duplicate position data based on boundaries of the plurality of minimum bounding areas and the one or more mapping rules.

10. The server of claim 1, wherein the transformation and cleaning module is to implement the one or more mapping rules to change at least one of structure of data in the original position data sets, representation of the data in the original position data sets, or content of original position data sets.

11. The server of claim 1, wherein the transformation and cleaning module is to:
  while implementing the one or more mapping rules, determine a dirtiness level of the original position data points based on boundaries of the plurality of minimum bounding areas;
  the dirtiness level refers to a number of duplicate or inaccurate position data points and is based on a number of the original position data points within one of the plurality of minimum bounding areas; and
  perform the transformation and cleaning of the some of the original position data points based on the dirtiness level.

12. The server of claim 1, further comprising a transceiver to receive messages from a plurality of wireless devices, wherein:
  the messages include position data of the plurality of wireless devices;
  the plurality of wireless devices do not include the wireless device in communication with the wireless station;
  the data analysis module is to group the position data of the plurality of wireless devices with the original position data points to provide a set of position data;
  the transformation and cleaning module is to, based on the plurality of minimum bounding areas and the one or more mapping rules, perform transformation and cleaning including (i) transforming a portion of the position data in the set of position data to updated position data, and (ii) cleaning the portion of the position data, such that the updated position data includes less position data than the portion of the position data; and
  the position estimation module is to, based on the updated position data, estimate positions of the plurality of wireless devices and the wireless device in communication with the wireless station.

13. The server of claim 12, wherein the plurality of wireless devices are assigned to and communicate with the wireless station.

14. A method comprising:
  loading, at a server, original position data sets stored in a first memory as part of a database to a second memory, wherein the original position data sets include original position data points, wherein each of the original position data sets further includes an identifier of a wireless station, wherein the original position data points are assigned to the wireless station and refer to positions of a wireless device in communication with the wireless station, and wherein the data loading module is to load each of the original position data sets based on the identifier of the wireless station in a corresponding one of the original position data sets;
  determining an overall bounding area based on the original position data points;
  dividing the overall bounding area into a plurality of minimum bounding areas;
  assigning the original position data points to the plurality of minimum bounding areas;
  based on the plurality of minimum bounding areas and one or more mapping rules, performing transformation and cleaning including (i) transforming some of the original position data points to updated position data points, and (ii) cleaning the some of the original position data points, such that the updated position data points includes less position data points than the some of the original position data points,
  wherein
  the one or more mapping rules includes determining a degree of heterogeneity of the original position data points based on boundaries of the plurality of minimum bounding areas,
  the degree of heterogeneity refers to differences in coordinate values and/or received signal strength indicator values of original position data points within one of the plurality of minimum bounding areas and is based on a number of the original position data points within the one of the plurality of minimum bounding areas, and
  the transformation and cleaning module is to perform the transformation and cleaning of the some of the original position data points based on the degree of heterogeneity; and
  performing database-based position estimation at the server to estimate a position of the wireless device based on the updated position data points.

15. The method of claim 14, wherein:

the some of the original position data points are transformed and cleaned in the second memory; and the second memory is separate from the first memory.

16. The method of claim 15, further comprising:

integrating the updated position data points with non-updated ones of the original position data points to provide integrated position data points;

performing a verification process to verify accuracy of the integrated position data points;

determining that the verification process is a success if, for a cumulative distribution function value, a position error for the integrated position data points is less than or within a predetermined range of a position error of the original position data points;

replacing the original position data points in the first memory with the integrated position data points if the verification process is a success; and causing transformation and cleaning of the updated position data points if the verification process failed.

17. The method of claim 14, further comprising:

determining whether a condition is satisfied to perform database-based position data cleaning, wherein the condition is satisfied when a ratio of (i) a number of position data sets corresponding to the wireless station to (ii) a size of a coverage area of the wireless station, is greater than a predetermined ratio;

if the condition is satisfied, permitting the transformation and cleaning of the some of the original position data points; and if the condition is not satisfied, preventing the transformation and cleaning of the some of the original position data points.

18. The method of claim 14, comprising:

defining the overall bounding area based on maximum coordinate values and minimum coordinate values of the original position data points; and dividing the overall bounding area into the plurality of minimum bounding areas based on a predetermined number of bounding areas.

19. The method of claim 14, further comprising:

determining which of the original position data sets includes duplicate position data based on boundaries of the plurality of minimum bounding areas and the one or more mapping rules;

averaging the duplicate position data in the original data sets and non-duplicate position data in the original data sets to provide the updated position data; and replacing the duplicate position data and the non-duplicate position data with the updated position data.

20. The method of claim 14, further comprising:

implementing the one or more mapping rules to change at least one of structure of data in the original position data sets, representation of the data in the original position data sets, or content of original position data sets;

while implementing the one or more mapping rules, determining a dirtiness level of the original position data points based on boundaries of the plurality of minimum bounding areas, wherein the dirtiness level refers to a number of duplicate or inaccurate position data points and is based on a number of the original position data points within one of the plurality of minimum bounding areas; and performing the transformation and cleaning of the original position data points based on the dirtiness level.

* * * * *

UNITED STATES PATENT AND TRADEMARK OFFICE
CERTIFICATE OF CORRECTION

PATENT NO. : 10,299,077 B1
APPLICATION NO. : 15/258437
DATED : May 21, 2019
INVENTOR(S) : Bochih Liu et al.

It is certified that error appears in the above-identified patent and that said Letters Patent is hereby corrected as shown below:

On the Title Page

Column 1, Item (73)  Delete "Marvel International Ltd., Hamilton (BM)"
and insert -- Marvell International Ltd., Hamilton (BM) --

Signed and Sealed this
Twenty-fifth Day of June, 2019

Andrei Iancu
*Director of the United States Patent and Trademark Office*